United States Patent [19]
Garland et al.

[11] 3,739,909
[45] June 19, 1973

[54] CAPSULE HANDLING APPARATUS AND METHOD

[75] Inventors: Carl C. Garland; Edmund J. Kwarsick, both of Detroit; Oscar B. Noren, Grosse Pointe Farms, all of Mich.

[73] Assignee: Parke, Davis & Company, Detroit, Mich.

[22] Filed: Oct. 6, 1971

[21] Appl. No.: 186,972

[52] U.S. Cl. ............... 209/90, 209/107, 198/33 AD
[51] Int. Cl. ............................................ B07b 13/04
[58] Field of Search ............... 209/107, 83, 99, 209/90, 379; 198/33 AD

[56] References Cited
UNITED STATES PATENTS
1,802,769  4/1931  Macia .............................. 209/107
3,069,049  12/1962  Brown ........................... 209/107 X
2,891,668  6/1959  Hunt ................................ 209/107
3,260,364  7/1966  England .......................... 209/107

*Primary Examiner*—Allen N. Knowles
*Attorney*—Robert R. Adams, David B. Ehlinger, George M. Richards et al.

[57] ABSTRACT

Apparatus and means are provided for handling articles, particularly tubular, cylindrical or elongated articles such as pharmaceutical capsules and the like, comprising an inclined slide or trough formed by trough-defining surfaces including the circumferential surfaces of rotating roll means adapted to move the articles lengthwise in single file down the trough and, if desired, for rectification and/or for gravity-sorting with respect to width and/or length size at one or more points along the trough. The apparatus can be used for any of various operational steps or combinations of steps such as conveying, sorting, rectifying, etc.

7 Claims, 9 Drawing Figures

INVENTORS
CARL C. GARLAND
EDMUND J. KWARSICK
OSCAR B. NOREN

BY David B. Ehrlinger
ATTY.

INVENTORS
CARL C. GARLAND
BY EDMUND J. KWARSICK
OSCAR B. NOREN

David B. Ehrlinger
ATTY.

CAPSULE HANDLING APPARATUS AND METHOD

SUMMARY AND DETAILED DESCRIPTION

This invention relates to apparatus and means for handling articles, particularly tubular, cylindrical or elongated articles such as capsules and the like. The invention is especially applicable to the handling of hard shell capsules and will be described in the following specification with reference, by way of illustration, to pharmaceutical capsules with separate cap and body parts having open ends which telescopically join together to form a closed envelope.

Prior to the present invention various means have been proposed for handling joined capsules. The problem is difficult because of the unsymmetrical shape and weight distribution, uneven surface, low mass, electrically chargeable surfaces, etc., of capsules. Prior art attempts to handle and convey capsules have included various means such as guide rolls, rectifier blocks, drop chutes and the like, but the same have in many cases been unduly complicated, expensive, etc.

It is therefore an object of the present invention to provide means for handling tubular, cylindrical or elongated articles.

It is also an object of the invention to provide means for handling, conveying, sorting, rectifying, etc., pharmaceutical capsules.

Still another object of the invention is to provide means for sorting tubular, cylindrical or elongated articles differing in length, according to predetermined length standards.

Yet another object is to provide economic means for rectifying standard-length joined capsules and, where appropriate, for rectifying the same from the output of a capsule production machine.

These and other objects, purposes and advantages will be seen from the following description of preferred embodiments of the invention in relation to the accompanying drawing in which.

Figure 1:
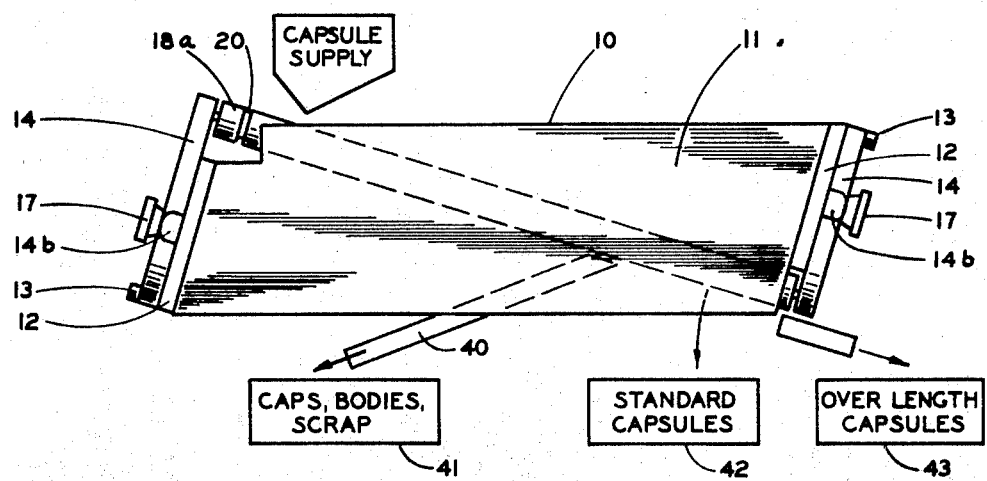
FIG. 1 represents in elevation a capsule handling apparatus according to the invention.
Figures 2, 3, 4:
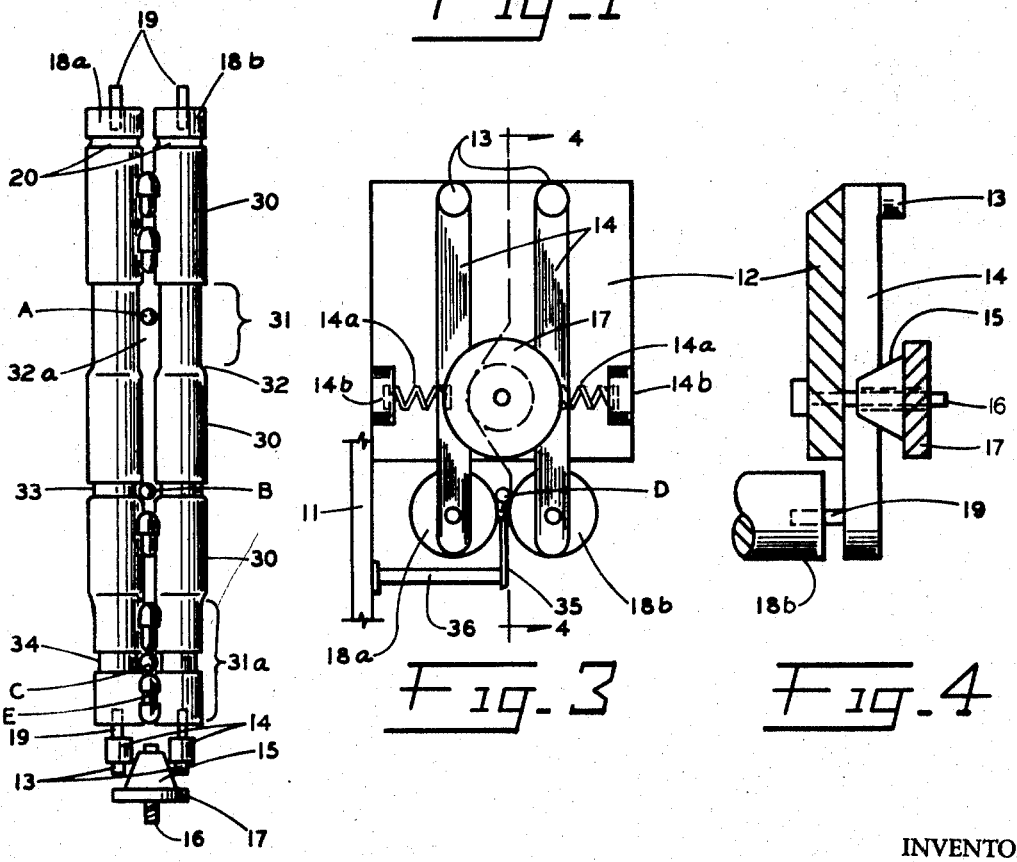
FIG. 2 is a top view of operative conveyor means of the apparatus.
FIG. 3 is an end view of the conveyor rolls showing means for spacing the same.
FIG. 4 is a side view partly in section taken on line 4—4 of FIG. 3.

According to the preferred embodiment illustrated in FIGS. 1 and 2, the article handling apparatus 10 of the invention is housed in a box-like frame having side walls 11 and end walls 12. Suspended from each of the end walls is a pair of opposing arms 14 arranged to pivot individually from wall mounted bolts 13. The arms 14 are spaced apart a predetermined distance by a cone cam 15 (FIGS. 2 and 4). The cone cam is centrally apertured for free sliding movement on a stud 16 mounted on the end wall 12. The cam 15, which bears against and serves to space the arms 14, is held in its spacing position by a guide wheel 17 threadably engaged on the stud 16. The arms 14 are compressed against the cam by coil springs 14a each of which is recess mounted within the respective arm and cooperating detent 14b. The act of advancing the guide wheel serves to change the relative position of the cam and the spacing of the arms.

At the end of the arms is mounted a pair of guide rolls 18a and 18b each journaled for rotation by suitable means such as ball bearing means (not shown) on a pair of end shafts 19. The rolls 18a and 18b are identical in shape and configuration, being especially contoured for handling (conveying, sorting, rectifying, etc.) tubular, cylindrical or elongated objects such as capsules, as specified in the description which follows.

Figure 5:
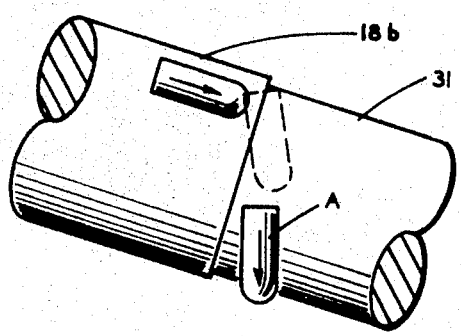
FIGS. 5, 6, 7a and 7b are side views of selected portions of a conveyor roll.

For convenience of description the rolls 18a and 18b have what may be referred to as an upper end, a mid-portion, and a lower end. At the upper end the rolls have grooves for driving by a belt 21. The general roll profile 30 (that is, the profile excluding segments of reduced diameter in the preferred embodiment illustrated) is substantially straight. The contour of the rolls, however, is circumferential so that the rolls juxtaposed together as shown in FIG. 2 form a V-shaped trough for handling or supporting articles in a bridging position substantially as shown for the capsule D in FIG. 3. The rolls 18a and 18b forming the trough may be parallel or they may be skewed slightly from parallel so that the trough widens from the upper end to the lower end. The roll profile 30 continues in a line to a reduced diameter setback 31 (FIGS. 2 and 5) which constitutes an exit opening or drop-hole 32a between the rolls. The trailing end of the setback 31 has an outward taper 32 which serves to keep conveyed capsules from catching and blocking flow in the area of the setback. Continuing along the mid-portion of the roll 18b, the profile 30 is next broken by a first drop-hole slot 33 and at the lower end by a second setback 31a (having substantially the same diameter as the first setback 31) and a second drop-hole slot 34. In the area of the latter slot 34 and upstream from it is a pair of guide fingers 35 (FIGS. 7a and 7b) mounted upon a support arm 36 which is adjustably mounted on the adjacent side wall 11 in an alignment channel (not shown). By these means the operating position of the guide fingers can be adjusted as desired with respect to the guide rolls. The apparatus also includes means shown in FIG. 8 for driving the guide rolls. As illustrated, the rolls 18a and 18b are driven by belt means 21 off a suitable power driven wheel for counter-rotation in the nip-free direction. The invention contemplates operation with two such rolls as illustrated or with additional pairs of rolls, preferably in a parallel array driven off a suitable power source and drive means, with idler rolls if desired for guiding the reach of the belt. The rolls, preferably metallic and fabricated to size by conventional metal working operations, can be contoured in any of various figurations depending on specific requirements. By way of illustration, for use with No. 1 standard hard shell capsules (regular or locking types as in U.S. Pat. No. 3,399,803), the above-described roll configuration in a preferred embodiment is dimensioned approximately as follows: diameter, 1.5 inches (3.81 cm.), axial length, 18 inches (45.7 cm.), setback depth, 0.006 inch (0.015 cm.) and axial length, 3 inches (7.6 cm.), and drop-hole 33 and 34 depth, 0.1 inch (0.25 cm.), and axial length, 0.2 inch (0.51 cm.).

OPERATION

Figure 8:
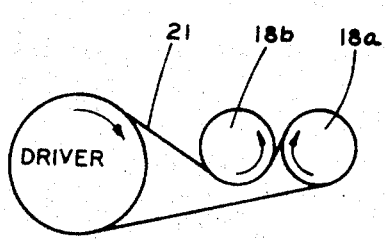
FIG. 8 is an illustration of an arrangement for driving the conveyor rolls.

Operation of the apparatus as a conveyor, sorter, rectifier, etc., is illustrated by the following description: the rolls 18a and 18b are each rotated at a rate conducive to good flow, that is, at a surface speed of about 50 feet (15.25 meters) per minute, in the nip-free direction (FIG. 8). Joined bulk capsules of a single size such as No. 1 capsules are introduced one by one using a vibrating trough feed or other suitable means onto the upper end of the trough surface of the guide rolls 18a and 18b. The rate of supply, e.g., about 150 capsules per minute, is such as not to overload the apparatus. For purposes of the invention, the trough-defining surfaces of the trough preferably are the circumferential surfaces of two paired rolls of the kind just described both rotating or adapted to rotate at the same or different speeds in the nip-free direction; these surfaces can also be the circumferential surfaces of one such roll paired with a stationary roll or with a stationary plane or curved surface of like dimension and geometry. The stationary surface, in other words, is equivalent in its trough-defining surface to the trough-defining surfaces of the rotating or rotatable roll (so that the cross-section at given points along the trough is substantially symmetrical or V-shaped). The term "nip-free roll means" where used herein is to be understood to define the single roll, or pair of rolls as the case may be, which rotates or is adapted to rotate in the nip-free direction, it being understood that at least one of the rolls must so rotate, and preferably both, to cause the capsules to move downstream along the trough according to the invention.

Regarding the quality of product from the output of a capsule production machine, capsules in bulk ordinarily contain minor percentages of unjoined caps and bodies, capsule fragments, and over-length capsules. As these capsules are supplied to the rolls 18a and 18b, the same seek the lowest support level in the trough-defining surfaces formed by the rolls and glide in single file down along the valley of the trough. The rolls it will be understood are closely spaced but not actually touching each other so that smaller capsule pieces drop through the space and are removed via chute 40 to the scrap tray 41 while the joined capsules and capsule parts are supported and conveyed downwardly in a stream at a steady rate. The spacing is such that bodies, caps, and standard joined capsules, in that order, all drop between the rolls during their path of travel on the trough but at different, spaced points in the path of travel. In this regard, it is important to space the rolls, at the cap drop 33, sufficiently close that standard joined capsules bridge the opening 33 but sufficiently far apart that cap pieces B fall between the rolls.

Figure 6:
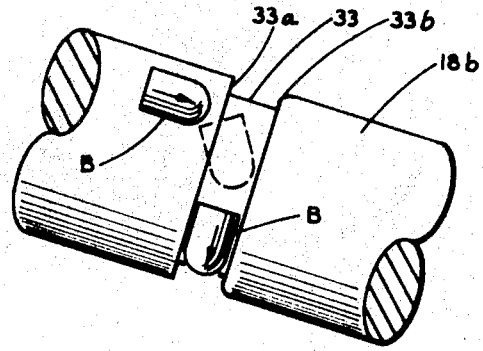

The angle of the inclination of the rolls to the horizontal can be varied to obtain the desired flow rate. A preferred angle is about 15°. As the capsules move down they first reach drop-hole 32a. Joined capsules and loose cap parts (B, FIG. 6) ordinarily pass on the trough surfaces but body parts (A of FIG. 5) being narrower lack support and are dropped by gravity and diverted to the scrap tray 41. The main flow of capsules continues to the drop-hole slot 33 where the capsule caps tilt (B of FIG. 6), drop individually through the slot and are separated. In this connection, the leading edge 33a of the drop-hole is at right angles to the profile 30 whereas the trailing edge 33b is conveniently streamlined or rounded to favor unrestricted flow of joined capsules past the drop-hole 33.

The standard-length joined capsules, making up a large majority of the capsule pieces in the lot, continue their onward flow together with the mentioned over-length capsules (that is, loosely joined capsules, capsules with uncut bodies and the so-called double-capped joined capsules). All of these flow to the lower end of the rolls (FIGS. 7a and 7b) and pass the guide fingers 35. The standard-length capsules by reason of their shorter length are conveyed above the ends of the guide fingers and are sorted from the trough at the drop-hole slot 34. They approach the slot in either of two ways: either body end first (C, solid outline, FIG. 7b) into the slot, or cap end first (C, broken outline, FIG. 7b) passing the slot and then pivoting back downward into the slot body end first. In both cases the spacing between rolls in the area of the drop-hole 34 (and hence the trough support surfaces located at either point immediately upstream 34a or downstream 34b of drop-hole 34) constitutes a fulcrum which is off the axial center of balance of a standard-length center-joined capsule supported at either of these points 34a and 34b. In this way, the standard-length capsules advantageously are rectified, or oriented, body end down for further processing, as desired, for example at a capsule filling operation, for capsule printing, etc. Alternatively, the capsules can simply be collected by gravity drop in a storage receptacle 42, as illustrated in FIG. 1.

Figure 7A:
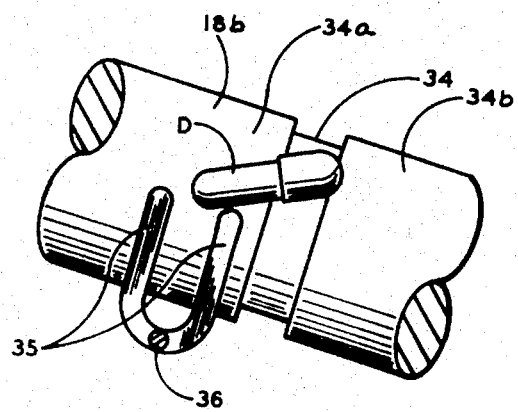
Figure 7B:
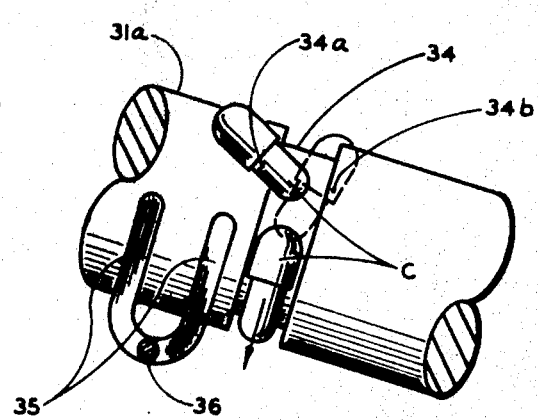

At the same portion of the trough the over-length capsules, especially loosely joined capsules or joined capsules having uncut bodies (D of FIG. 7a), continue to move down the trough but because of their lack of balance and support (only their cap portions bridge the gap between the rolls) drop with body end lowermost into the position illustrated in FIG. 7a. In this position the body contacts the upper end of the guide fingers 35. The fingers serve to support the capsule D to keep it from dropping body end first into the drop-hole 34. In this way the over-length capsules mentioned are caused to flow past the drop-hole slot 34 and be conveyed downward to the end of the trough and outward into the exit chute and tray 43.

In the same fashion, the so-called double cap capsules (E, FIG. 2) are conveyed (but without contacting the finger ends 35) to the end of the trough and out to the tray 43. In other words, the spacing between the rolls 18a and 18b is such that, of all the capsules and pieces conveyed during the run, ordinarily only the double caps (E) are conveyed the entire length of the trough at a relatively high level without dropping between the rolls. Certain scrap pieces (jammed pieces, trimmings, etc.) are removed at the body drop 31 or cap drop 33 if undersize or, if oversize, at the end exit 43.

The apparatus 10 can be adjusted, from one run to another, to accommodate different sizes of article by means of the cam 15 and guide wheel 17 combination at each end of the rolls. Thus, the rolls illustrated are suitable for various conventional capsule sizes, particularly Nos. 0, 1, 2, 3, 4, and 5, both in regular and locking form, and either empty or filled with capsule filling material. As indicated, the rolls can be set for parallel operation or for skewed operation, that is with the rolls slightly out of parallel with gradually widening spacing in the machine direction. The general profile of the rolls can be straight, as shown, or curved (that is, with generally parallel, curved profiles). For reasons of economy, the profile is preferably straight.

While the invention in article handling apparatus and method has been described in considerable detail in the foregoing specification, it will be realized by those skilled in the art that wide variation can be made in such detail within the spirit of the invention claimed below; it is intended that the claims be interpreted to cover both the invention particularly described and any such variation.

We claim:

1. Apparatus for handling standard-length capsules, over-length capsules, capsule caps, capsule bodies and the like, comprising an inclined slide or trough formed by trough-defining surfaces including the circumferential surfaces of nip-free roll means, means for serially introducing the articles onto the trough, the roll means being adapted to be rotated to cause articles in the trough to stream coaxially down the trough in single file, a circumferential segment of the roll means at a predetermined portion of the trough being contoured so as to provide an opening or drop-hole in the trough dimensioned to receive a standard-length capsule, for selectively sorting out standard-length capsules from the stream of passing articles, and guide finger means positioned upstream from the capsule drop-hole below the path of travel of standard-length capsules but intersecting the path of travel of over-length capsules, the guide finger means being adapted to provide support for oncoming over-length capsules such that the over-length capsules are maintained on a path above the capsule drop and are caused to bypass the same.

2. Apparatus according to claim 1 for sorting out capsule bodies having an opening in the trough dimensioned to receive a capsule body and being smaller than a capsule cap diameter.

3. Apparatus according to claim 1 for sorting out capsule caps having an opening in the trough dimensioned to receive a capsule cap.

4. Apparatus according to claim 1 for sorting capsules wherein the trough surface at spaced intervals is apertured to receive respectively capsule bodies, capsule caps and standard-length joined capsules.

5. Apparatus according to claim 1 for rectifying capsules wherein the trough support surfaces located at either point immediately upstream or downstream of the capsule drop-hole opening define a fulcrum which is off the center of balance of a standard-length joined capsule located at either of said points whereby any such off-balanced capsule is caused to pivot body end first into the opening thereby rectifying the same.

6. Method of sorting capsules and capsule parts by apparatus means according to claim 1, comprising moving the capsules and capsule parts downwardly in single file on an inclined trough, and sorting out respectively capsule bodies, capsule caps and joined capsules by gravity drop through aperture means.

7. Method of rectifying joined capsules by apparatus means according to claim 1, comprising moving the capsules downwardly in single file on an inclined trough and pivoting the capsules, body end first, into aperture means in the trough by means of adjacent trough support surfaces defining a fulcrum off the center of balance for each such capsule, whereby the capsules are rectified.

* * * * *